Figure 1:
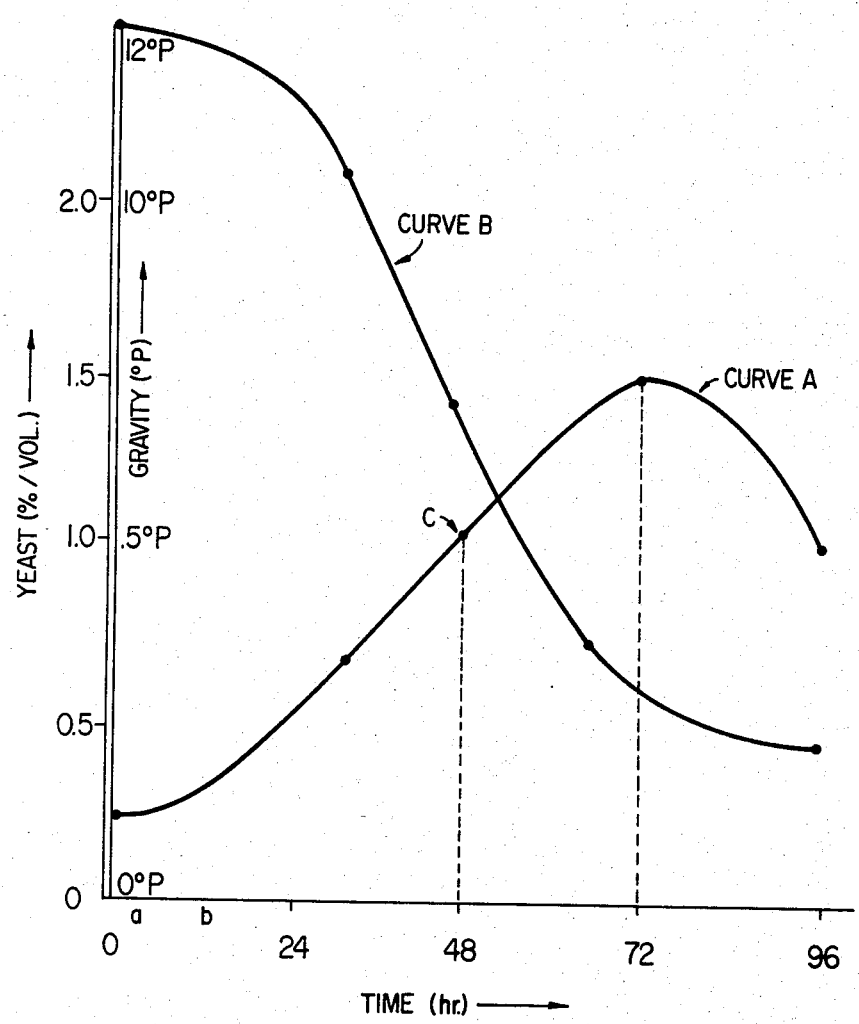

United States Patent [19]

Geiger

[11] Patent Number: 4,507,325

[45] Date of Patent: Mar. 26, 1985

[54] PROCESS OF BREWING WITH AN ADJUNCT OF HIGHLY FERMENTABLE SUGAR

[75] Inventor: Kenneth H. Geiger, London, Canada

[73] Assignee: Labatt Brewing Company Limited, London, Canada

[21] Appl. No.: 140,874

[22] Filed: Apr. 16, 1980

Related U.S. Application Data

[63] Continuation-in-part of Ser. No. 123,978, Feb. 25, 1980, abandoned, which is a continuation of Ser. No. 937,776, Aug. 29, 1978, abandoned.

[51] Int. Cl.³ .................. C12C 11/00; C12C 5/00; C12G 3/00
[52] U.S. Cl. ..................................... 426/16; 426/13; 426/29
[58] Field of Search ............... 426/11, 16, 13, 29, 426/60; 435/256

[56] References Cited

U.S. PATENT DOCUMENTS

| | | | |
|---|---|---|---|
| 960,841 | 6/1910 | Defren | 426/16 X |
| 2,783,147 | 2/1957 | Pauls et al. | 426/13 |
| 3,379,534 | 4/1968 | Gablinger | 426/16 |
| 3,717,471 | 2/1973 | Stat et al. | 426/16 X |
| 4,038,420 | 7/1977 | Pollock et al. | 426/16 |
| 4,138,499 | 2/1979 | Strauss et al. | 426/16 |
| 4,140,799 | 2/1979 | Nagodawithana et al. | 426/16 X |

OTHER PUBLICATIONS

Kirsop et al., Some Effects of Wort Composition on the Rate and Extent of Fermentation By Brewing Yeasts, J. Ins. Brew, vol. 78, 1972, (pp. 51–57).

*Primary Examiner*—David M. Naff
*Attorney, Agent, or Firm*—Fisher, Christen & Sabol

[57] ABSTRACT

The present invention provides an improved brewing process which utilizes an adjunct comprising a highly fermentable sugar. In the process, brewers' yeast is allowed to act upon a, preferably all-malt, wort until said yeast is partially developed, following which, the adjunct is introduced into the partially fermented wort in a manner which will not have adverse effects on the yeast and the brewing process carried to completion. The adjunct is introduced over a period of time such that the Plato value of the fermenting wort substantially does not increase and osmotic shock is avoided. The process is especially advantageous when used to produce the so-called light beers.

35 Claims, 4 Drawing Figures

Also, as is well known, even minor changes in wort composition, brewing conditions, etc. radically alter the character and consistency of the beer product. Therefore, in processes such as that described in U.S. Pat. No. 3,379,534, varying the malt extract: glucose ratio in the wort obviously results in a number of products having widely variable characteristics, reduction of the malt content being known to result in a reduction in flavour stability.

Among the many publications in the brewing field that are concerned with producing light beers is U.S. Pat. No. 4,038,420 which describes a brewing process of the double fermentation type wherein a sugar adjunct is used, (not to produce a product having a reduced residual sugar content but) to increase the throughput of a given plant, i.e. reduce costs. In the claimed process, a malt wort having a nitrogen content much higher than normal and sugar solution are generally separately and completely fermented with yeast, following which the fermented wort and fermented sugar solution are blended to provide a beer product. Although the claimed invention is directed only to the case where both malt wort and sugar solution are completely and separately fermented prior to their being blended, there is reference in the text to adding unfermented sugar solution to partially fermented malt wort, the resulting mixture is then subjected to a second fermentation in which a substantial excess (ten times the amount used in the first fermentation) of additional yeast is simultaneously added, which yeast actually effects the second fermentation.

Applicant is also aware of an article entitled "Some Effects of Wort Composition on the Rate and Extent of Fermentation by Brewing Composition on the Rate and Extent of Fermentation by Brewing Yeast" by B. H. Kirsop and M. L. Brown, J. Inst. Brew. Vol. 78, 1972, which article, as with the Pollock patent, deals primarily with the rate of speed of fermentation. The article reports the results of laboratory evaluations of the effect on some fermentation characteristics of varying a malt wort composition. The experiments effected always utilized stirred conditions which are, in fact, not commonly used commercially; static fermentations invariably being used. It was found that the time required to ferment worts of various compositions to a given extent (always leaving >4% residuals sugars as is usual in the United Kingdom) depends upon the extent of exponential growth in the early stages of fermentation and that growth was dependent on the concentration of assimilable nitrogen. The nitrogen concentration in the wort was varied by adding to the wort, via a one-shot procedure, quantities of carbohydrate material, (which, in effect reduced the nitrogen-containing fraction), including mainly maltose (the major fermentable carbohydrate from malt) and also glucose. It was found that the yeast produced during exponential growth in the malt wort was able to ferment rapidly much greater quantities of readily and highly fermentable carbohydrate than was present in that wort. Moreover, it was also concluded that the yeast strains evaluated ferment equally well when either maltose or glucose is added to the malt wort; and, moreover, the result was the same whether the said carbohydrate was added prior to fermentation or toward the end. The sole exception was a yeast strain which was known to attenuate poorly and which, for example, normally failed to utilize maltatriose, one of the difficultly fermentable carbohydrates from malt. In summary, the article teaches that, if sufficient assimilable nitrogen is present in the wort the yeast growth during the exponential phase is adequate to rapidly ferment the maltose from the malt and additional glucose introduced into the wort anytime during the fermentation.

An object of the present invention is to provide a brewing process capable of producing any one of a desired variety of beers having different characteristics which process is advantageously used to produce the commonly termed "light" beers.

Another object of the present invention is to provide a brewing process wherein a significant portion of the malt extract in the wort can be replaced by a highly fermentable sugar without the concomitant development of fermentation negatives.

A further object of the present invention is to provide a brewing process wherein a highly fermentable sugar is utilized as adjunct, and such adjunct can be introduced into the wort in a highly concentrated form under selected conditions whereby the yeast is spared shock which would adversely change its performance and the qualities, characteristics and consistency of the resulting alcoholic beverage.

STATEMENT OF INVENTION

According to the present invention there is provided an improved brewing process of the type wherein a malt wort is prepared; supplemented with a sugar adjunct; fermented with brewers' yeast; and, following completion of the fermentation, finished to the desired alcoholic brewery beverage; the improvement comprising initially fermenting a malt wort with brewers' yeast until said yeast is partially developed to at least about one-half of the maximum amount of development obtainable during the fermentation, thereby providing a partially fermented wort, thereafter introducing an adjunct comprising a highly fermentable sugar into the partially fermented wort over a period of time such that the Plato value of the fermenting wort substantially does not increase and osmotic shock is avoided, and then continuing the fermentation.

It is preferred that the Plato value of the wort during the fermentation continue to decrease as it does in a standard fermentation—refer for example to FIG. 1. Consequently, the enzyme systems in the yeast will continue to function in substantially the same manner since the environment, i.e. medium, is effectively unchanged from that extant in the standard fermentation.

Preferably said yeast is initially partially developed to at least two-thirds of the maximum amount of development obtainable during the fermentation.

In one embodiment in accordance with the invention the wort is all malt wort whilst in a preferred embodiment the malt comprises brewers' malt and one or both of distillers' malt and caramel malt.

Generally the adjunct is introduced ("infused") into the partially fermented malt wort commencing from 18 to 54 hours after the fermentation of the wort has commenced; for some embodiments of the process the adjunct is introduced commencing from 18 to 36 hours after the fermentation has commenced and for other process commencing from 44 to 54 hours after fermentation has commenced. Preferably, infusion is substantially continuous over the time period in question.

Preferably the adjunct is introduced, i.e. infused, into the partially fermented malt wort over a period of time and more preferably over a period of from 12 to 48 hours.

PROCESS OF BREWING WITH AN ADJUNCT OF HIGHLY FERMENTABLE SUGAR

This is a continuation-in-part of application Ser. No. 123,978 filed Feb. 25, 1980, which in turn is a continuation application of U.S. Ser. No. 937,776, filed Aug. 29, 1978, both now abandoned.

The present invention relates to a brewing process, and in particular, to a brewing process capable of producing any desired one of a variety of beers having different characteristics.

BACKGROUND OF INVENTION

In a standard brewing process a fermentation substrate, "wort", is prepared from barley malt and, in most instances, additional carbohydrate adjunct material. The spectrum of saccharide materials in the wort depends on the characteristics of the malt that is used, the mashing conditions and the type and amount of adjunct material that is used. The adjunct material may be any appropriate form of starch or sugar.

Though maltose represents the largest percentage of the fermentable sugars derived from brewers' malt under standard mashing conditions invariably there are present in the wort additional fermentable sugars that are preferentially metabolized by the yeast. These sugars are sucrose, fructose and glucose and are hereinafter referred to as "highly fermentable sugars". However, the metabolism of these highly fermentable sugars, when present in a wort in abnormally high concentrations with respect to maltose, compared to the relative amounts of such substances in a standard wort, contribute significantly to the organoleptic properties, and hence basic character, of the resultant beer.

Also contributing to said organoleptic properties are the products obtained from the wort nitrogenous material originating from the malt. Further contributors to the organoleptic properties of the beer product are the yeast which effects the desired fermentation and the hops which are introduced into the wort during boiling thereof in the kettle.

If the amount of highly fermentable sugar, and in particular, glucose, in the wort when fermentation commences is incresed significantly, say to over 10–12%, then the fermentation response of the yeast changes significantly. As noted above the yeast preferentially metabolizes the highly fermentable sugars, especially glucose, and if the amount thereof is increased as described above, the yeast will utilize essentially the glucose during its rapid growth phase and for a period thereafter. As a consequence, although the yeast may metabolize the maltose to some degree it does not adequately develop its capability to metabolize the more complex and difficultly fermentable sugars such as maltotriose and as a result, is unable to do so efficiently, if at all, in the latter part of the fermentation. Complete generation of the components which provide the beer product with its fundamental characteristics is not achieved. In addition, such systems are proven to result in "hanging" fermentations: i.e. an incomplete fermentation wherein some of the content of sugars which are fully fermentable by yeast are not actually converted during a normal fermentation period.

It should also be noted that the difficultly fermentables, such as maltotriose, and traditionally non-fermentables, such as dextrins and the alcohol content are largely responsible for the caloric content of the desired beer product.

Beers which, inter alia, have a caloric value lower than conventional beers, usually by a third or more, are enjoying increasing popularity. The light beers usually have a reduced alcohol content, about 20% generally, but this is not sufficient to give the desired reduction in caloric value. It is, therefore, necessary to reduce the amount of non-fermentable sugars which emanate from the malt and adjunct, and which generally carry through the brewing process unchanged.

U.S. Pat. No. 3,379,534 attempts to solve this latter problem by providing a process for preparing beer wherein the amylolytic enzyme amyloglucosidase is added to the mash and/or during the fermentation step of the brewing process. This is stated to impart to the resulting beer the property to remain free from haze for periods surprisingly longer than previously possible and also imparts to the resulting beer a lower calorific value than normally produced beers due to a reduction in the dextrin content. Although a minor amount of debranching enzymes may normally be present in the brewers' mashing materials, the amount thereof and the conditions extant in the wort result in their activity being insufficient to reduce to a significant extent the dextrins in the wort. Hence it is considered necessary according to the teaching of U.S. Pat. No. 3,379,534 to add amyloglucosidase to break down the dextrins in the fermentation medium and this will result, unless specific steps to the contrary are taken, in a residue of the enzyme in the bottled beer product which residue may continue to react and this can lead to flavour instability, i.e. inconsistent product. Moreover, the introduction of additives into food products is presently causing increased concern of possible health-related effects.

A further process which produces a lower carbohydrate beer is to be found in U.S. Pat. No. 2,783,147, the disclosed process employing prolonged mashing and repeated additions of diastase for increasing the proportion of fermentable carbohydrates. These additions of diastase are followed by fermentation to produce a low carbohydrate beer, the process requiring substantial additional effort on the part of the brewer in addition to the normal brewing operations.

Yet a further process for producing a low carbohydrate alcoholic beer is disclosed in U.S. Pat. No. 3,717,471, the claimed process involving subjecting barley malt to aqueous extraction under conditions favourable to the extraction of protein whilst unfavourable to the extraction of carbohydrates, hence the amount of non-fermentable sugars extracted is reduced. A highly fermentable sugar is then added to the resulting extract to produce, effectively, a reconstituted brewers' wort low in unfermentable carbohydrates. The final step involves fermenting the wort so produced. It should be noted that the reconstituted wort comprising the combined malt extract and the highly fermentable sugar (an example being glucose) is subjected to the action of brewers' yeast to form the desired product. The main claimed advantage of this process is the fact that there can be no residual added enzymes, such as the amyloglucosidase of U.S. Pat. No. 3,379,534, in the beer product and the product is claimed to be analytically and organoleptically comparable to conventional beers. However, this process is subject to the disadvantages discussed above, inherent in malt fermentation process initiated in the presence of large amounts of highly fermentable sugars as adjunct.

Preferably the adjunct is introduced into the fermenting wort in the form of an aqueous solution, said solution preferably comprising from 10% to 65% by weight of adjunct and most preferably at least 15% and generally 20 to 65% and most preferably 40% to 65% by weight of adjunct.

Preferably the adjunct is solely a highly fermentable sugar and may conveniently solely comprise sucrose.

The invention also envisages an alcoholic brewery product when made by the brewing process according to the invention.

By the process of the present invention predictable production of the substances which determine the desirable favourable flavour characteristics, etc. of the beer product is ensured, and a reduction in flavour stability, widely associated with reducing the malt content of wort, is eliminated. In addition, the fully developed yeast is able to act most effectively on the remaining wort and the adjunct addition thereby obtaining highly desirable low real extract values. In such instances, the degree of attenuation will generally be significantly higher than that obtained during normal brewing procedures, say 80% or more compared with maximums in the mid-70% range for normal brewing procedures. The capability for increased attenuation provides the present process with a further degree of flexibility since that capability need not be utilized to its fullest extent: in other words, a reduced degree of attenuation can be used as explained in more detail below to produce, for example, malt liquor or other products.

It will be appreciated that the type of malt wort and the ratio of wort to adjunct may vary between relatively wide limits, these factors being determinative as to the desired product. For example, in a highly preferred embodiment of the present invention where the process is used to produce a low calorie alcoholic product (i.e. light beer), an all-malt wort is used and the ratio malt wort: highly fermentable sugars is such that the amount of non-fermentable sugars which will carry through to the final product are minimized. In such cases, the adjunct will consist only of the highly fermentable sugars, and any non-fermentable sugars in the final product will originate largely from the malt. In this way, increasing the amount of highly fermentable sugar relative to the malt extract in the wort will have the effect of reducing the percentage of non-fermentable sugars and hence the caloric value of the final product. It will also be appreciated that varying the amount of sugar in this way will effectively provide a series of products having differing alcohol contents but having basically similar organoleptic properties.

In an alternative embodiment of the process of the invention, the malt wort:adjunct ratio may be varied at will with the sole objective of brewing a beer product having the desired organoleptic and other properties, the adjunct being either solely highly fermentable sugars or such sugars in combination with conventional adjunct materials. In this instance, the amount of non-fermentable sugars in the final product may be varied and such materials may emanate both from the malt wort and the conventional adjunct materials used.

The process of the invention may utilize a conventional brewers' malt. However, in one aspect, it is preferred to use a malt system comprising brewer's malt in combination with distillers' malt and/or caramel malt.

Figure 2:
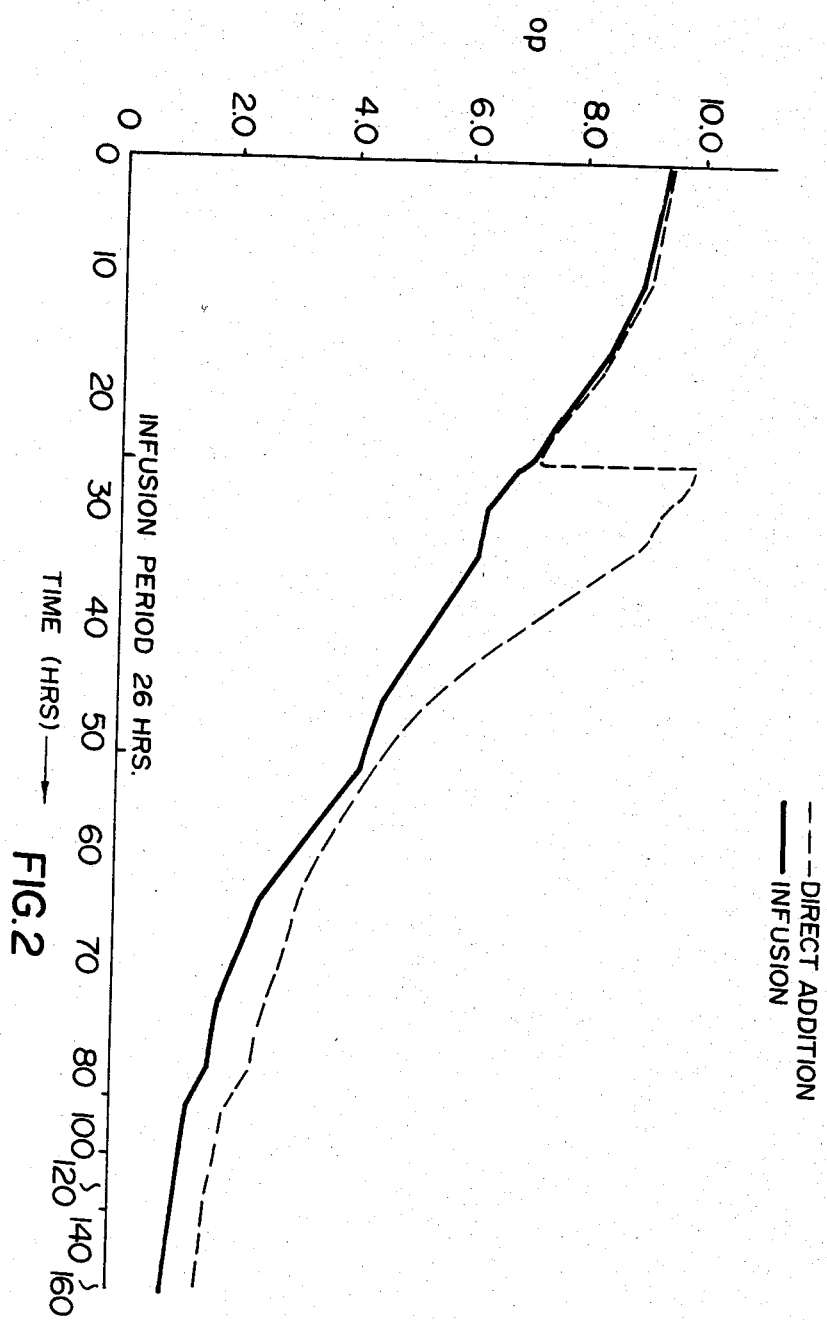
Figure 3:
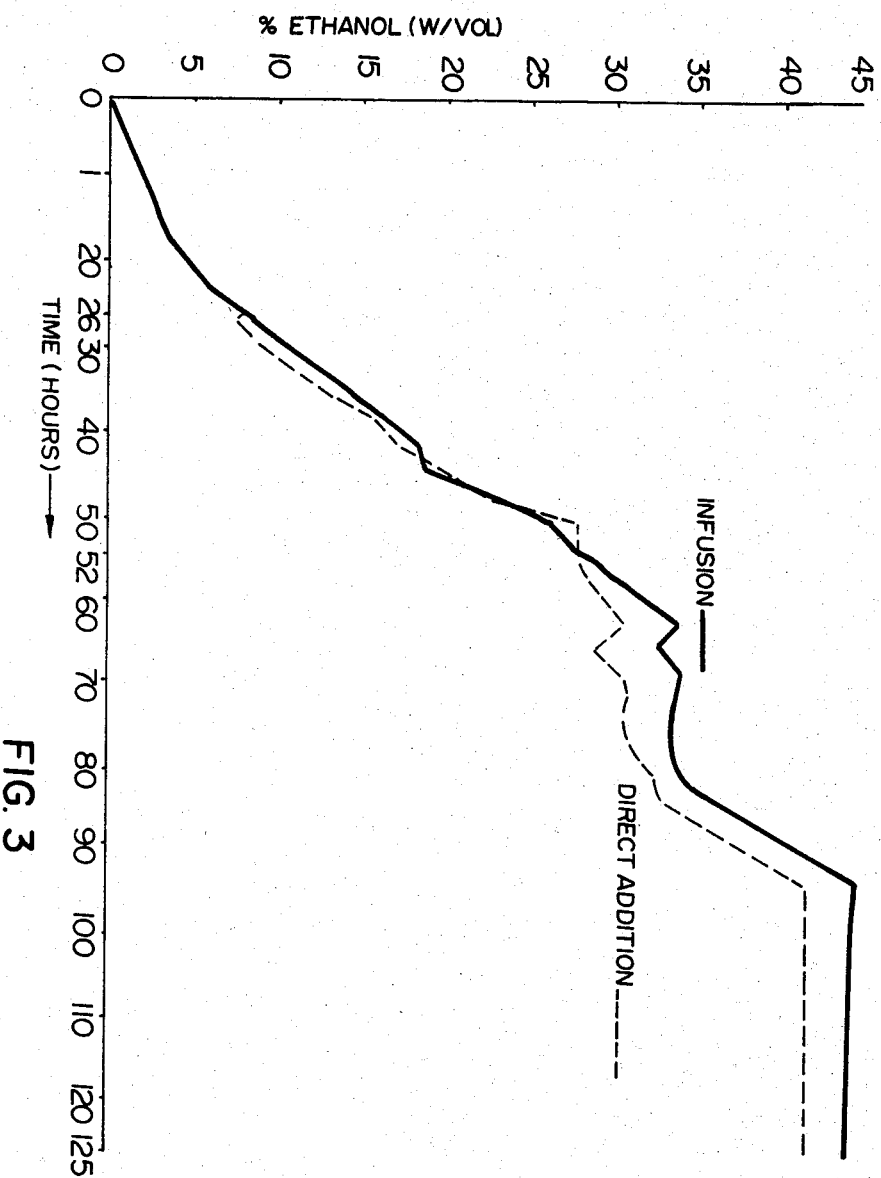
Figure 4:
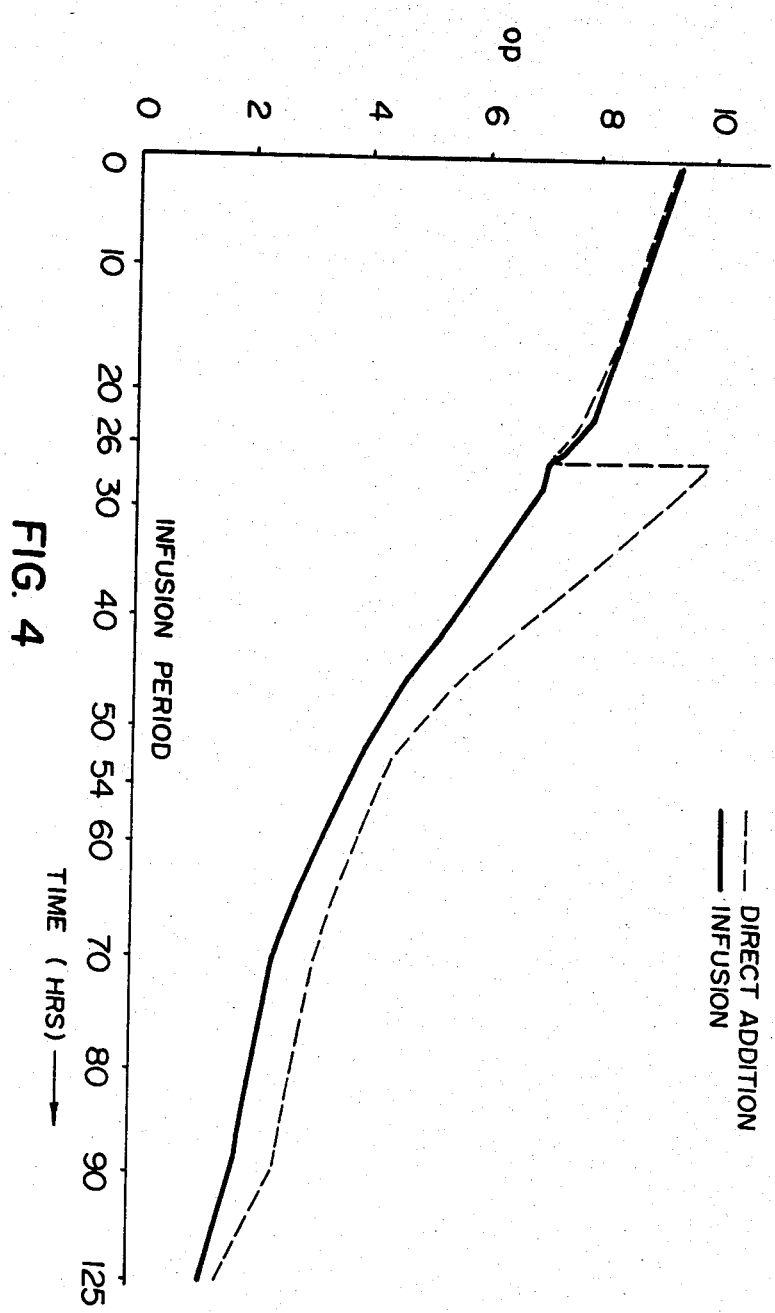

The present invention will be further described in part by reference to the accompanying drawings in which:

FIG. 1 details the growth response of yeast and the corresponding decrease in gravity in the wort of a normal fermentation effected at 58° F. using a 12° P. wort;

FIG. 2 details the decrease in gravity in the worts of a fermentation carried out according to the infusion process of the present invention and a fermentation carried out using the direct or one-step addition procedure, the adjunct comprising sucrose;

FIG. 3 details the increase in alcohol content during the fermentations of FIG. 2; and FIG. 4 details the decrease in gravity in the worts of a fermentation carried out according to the infusion process of the present invention and a fermentation carried out using the direct or one-step addition procedure, the adjunct comprising glucose.

The time required for the yeast to act upon the malt wort prior to the addition of the fermentable sugar may vary depending upon fermenting conditions. This matter is discussed in detail with reference to FIG. 1 of the accompanying drawings.

The amount of yeast in suspension during the fermentation is calculated as a percentage of the total fermenting mass. It can be seen from FIG. 1 curve A that, following an initial short lag period, a period of rapid growth ensues until a maximum yeast value is attained, usually at about seventy-two (72) hours, following which, the yeast population in suspension remains constant or even falls thereafter until finally fermentation is, from a practical viewpoint, completed, although the available fermentable sugar supply is not generally fully exhausted at that time. The reason for this is that the changing fermentation conditions, alcohol content, oxygen content, etc. and condition of the yeast eventually result in the latter becoming ineffective. In the process of the present invention, it is essential that the yeast quantity is developed to a significant extent prior to the addition of the highly fermentable sugar. In the fermentation shown graphically in FIG. 1, the required degree of yeast growth is considered to have taken place by about point C, i.e. after about forty-eight (48) hours of fermentation. It will be readily appreciated that the specific time interval is not really significant or critical; this can vary widely since it depends on many parameters of the fermentation process, for example, temperature employed and original gravity of the wort. The only significant factor is the amount of yeast growth relative to the amount of yeast growth attainable as dictated or pre-determined by the specific fermentation system. It should perhaps be emphasized that the maximum numerical amount or population of yeast in suspension is attained at a relatively early stage in the fermentation and that amount is maintained, or even slowly diminishes, over the remainder of the fermentation. As stated, in the typical wort fermentation situation represented in FIG. 1, sufficient yeast development has been achieved by point C, i.e. yeast growth is equal to at least about half and preferably about two-thirds of the maximum population attainable under the prevailing fermentation conditions.

The information necessary to determine the, preferably all malt, wort fermentation period is easily obtained by carrying out a trial fermentation, generally on the laboratory or pilot brewery scale.

The previously mentioned one-half to two-thirds minimum ratio of yeast growth is generally applicable and hence, this, in combination with the experimentally obtained yeast growth curve, allows the minimum period which must elapse prior to the addition to the wort of the adjunct comprising highly fermentable sugar to be readily determined.

The time period for commencement of fermentation to point C may vary quite widely depending mainly on the type of beer or ale being brewed and on the conditions but is usually at least 24 hours and generally between 36 and 50 hours for lager; about 44 to 54 hours having been found fully satisfactory. However, ales generally have higher fermentation rates and a period of 18 to 36 hours is satisfactory.

The ratio of extract obtained from the malt:extract obtained from the highly fermentable sugar is not critical and may by varied quite broadly. However, the ratio in general should be at least 60:40 up to about 80:20 usually at least 65:35 is desirable for the production of "light" beer products, a ratio of about 70:30 being greatly preferred.

The highly fermentable sugars—sucrose, fructose and glucose—may be introduced into the partially fermented wort in any convenient physical form, e.g. solid or liquid (syrup or in solution). It has been found that solutions of such sugars are easily handled and consequently preferred. The concentration of such solutions is not critical and may vary widely: however, more concentrated solutions are very advantageous in many instances since, as a consequence lower volumes of solution need by handled. For that reason, and as stated hereinbefore, sugar concentrates within the range of about 15% (about 15° P.) but generally 20%, and especially 40% to as high as 65% (about 58° P.) by weight are preferred. Solutions more concentrated than 65% are quite viscous and consequently are more difficult to handle on a commercial scale.

The use of the highly fermentable sugar as the adjunct allows, as stated above, a wide variance in the amount of malt used and this provides for significant flexibility in the final brewery products obtainable. In addition, further flexibility as regards the organoleptic properties of the beer products may be obtained by changing the malt used or, indeed, by using mixtures of various kinds of malt having, for example, difference tastes and/or enzymic activities. For example, the process of the present invention may be used to great advantage to produce a low calorie reduced alcohol content beer, i.e. beer having a caloric value per twelve (12) ounce unit of, say, less than 100 and an alcohol content of about 4% v/v., compared with the usual value of about 145–150 with an alcohol content of about 5% v/v. It should be emphasized that the full reduction in caloric value of the fermented beer product referred to immediately above is not accounted for solely by the reduction in alcohol content. The process of the present invention does allow the amount of malt used to be reduced compared with a normal brew with the result that the amount of non-fermentable sugars in the final product which emanate from the malt, are considerably reduced. In addition, the adjunct preferably comprises solely highly fermentable sugars which add substantially no non-fermentable sugars to the wort. Moreover, and significantly, it has been found that the withholding of the highly fermentable sugars during the initial growth phase according to the present invention is conducive to more vigorous utilization by the yeast of materials from the malt which materials are relatively more difficult to ferment and which the yeast will not attack if other more easily fermentable sugars are present. Consequently, a significant proportion of the more refractory fermentable sugars which are traditionally considered "non-fermentable" sugars are fermented during the process of the present invention, adding significantly to the reduction in caloric value and desirable organolpetic properties and, it may be noted, rendering the fermentation process more efficient since additional alcohol is obtained from the said "non-fermentable" sugar substrates.

In summary, the process of the present invention due in part to the significantly increased degree of attenuation which is achieved, allows the more efficient production of "light" products having reduced caloric values form worts having standard Plato values say 7°–11° P. To our knowledge, prior to the present invention, this was only possible with brewing processes which utilized additional enzymes, such procedures having significant disadvantages (refer to the discussion above with respect to U.S. Pat. No. 3,379,534). The process of the present invention, therefore, allows some reduction in product caloric value without a reduction in alcohol content.

It should be borne in mind, however, that many desirable characteristics of beer, such as body, taste, etc. are due in part to the presence in the beer of the said "non-fermentable" components. Consequently, it is preferable in certain circumstances to not attain the maximum degree of attenuation which the present process allows in the interests of obtaining desirable organoleptic properties in the beer product. Such a situation is encountered for example in the production of the fuller bodied, generally higher alcohol content products known, in Canada and elsewhere as "malt liquors". In other words, the process of the present invention has greater flexibility and allows "tailor-making" of products as desired, even including regular beer.

Since the present trend in many countries, for example Canada and the United States, is toward alcoholic brewery products having lower alcohol contents than in the past, the process of the present invention provides a major advantage in that it can be used to prepare such products without adversely affecting the properties which give the product its "beery" qualities, an essential characteristic difficult, if not impossible, to provide in prior art low calorie beer products without the addition of special agents such as further enzymes capable of degrading the non-fermentable sugars. Therefore, although some reduction in caloric value can be obtained using the process of the invention without reducing the alcohol content significantly, if a large reduction in a beer product caloric value is to be obtained and a full acceptable "beer" character and taste is to be retained, then a reduction in alcohol content, say from the usual 5% v/v. to the 4% v/v. discussed above may also be required in order to eliminate even more caloric imparting components from the product.

As indicated above, the process of the present invention may also be used to advantage to produce alcoholic brewery products other than the previously mentioned reduced caloric products. Since the alcohol content can be widely varied without significantly altering the organolpetic properties of the product, the procedure of "designing" a product is greatly simplified in that attention may be focused on the all important factors required to obtain the desired taste and other properties which determine the basic character of the desired product.

The presentation of the highly fermentable sugars to the yeast in this fashion during the latter part of the yeast growth period approximates the natural generation of fermentable sugars by any amylolytic enzymes that may be present in or added to the wort during the fermentation stage. The result is that the relative amount of fermentable sugar does not significantly increase, i.e. the Plato value of the fermenting wort continues to decrease, or does not increase substantially. In effect, the fermentable sugars are assimilated being utilized by the yeast at a rate equal to or even greater than they are being introduced into the wort. This controlled introduction of the sugar into the fermenting wort over a period of time, which is obviously different from the alternate case wherein the total amount of sugar is added to the ferementing wort in one batch over a relatively short period of time, is termed "infusion" herein. In this way, adverse effects such as osmotic shock and the fermentation negatives, etc. which could affect the performance of the yeast, etc. and consequently, introduce further variables into the process, make product quality control difficult and product consistency very uncertain are eliminated.

The present invention will be further described with reference to the following Examples.

EXAMPLE 1(i)

This example details the production of a beer product having a reduced caloric value (according to the definition referred to above). In order to demonstrate the superior characteristics of this process over the prior art processes, and, in particular, that of U.S. Pat. No. 3,717,471 duplicate experiments were conducted as follows:

PROCEDURE

An all-malt wort (9.4° P.) was prepared using standard techniques familiar to those skilled in the art of brewing. The wort was then divided into two equal portions, A and B. To portion A was added an equivalent quantity value of a highly fermentable sugar, namely a sucrose solution (6.5° P.) such that 40% of the final extract was derived from the added sucrose. The resulting "wort" mixture was then pitched with yeast, fermented and finished to the final beer product under standard brewing conditions.

Portion B was pitched in the fermenter with an equal quantity of yeast and fermentation under standard conditions allowed to proceed for forty-eight (48) hours. Commencing at that point, a similar amount of sucrose solution as used in portion A above was infused into the fermenter over the succeeding twenty-four (24) hour period.

The properties of the resulting beer products are given in the following table:

|  |  | A | B |
|---|---|---|---|
| Apparent Extract | % | 0.43 | 0 |
| Real Extract | % | 1.88 | 1.34 |
| Alcohol (wt) | % | 3.06 | 3.30 |
| Alcohol (v) | % | 3.89 | 4.17 |
| Calculated Original Extract | % | 8.0 | 7.9 |
| Caloric value (12 oz.) (normalized to 4% alcohol by volume) | % | 109 | 93 |
| Attenuation | % | 76.5 | 83 |

It can be seen that the process of the present invention resulted in a significant decrease in real extract value and a product (B) which has a reduced caloric value compared with comparison A, although its alcohol content was higher, and a significantly higher degree of atteunation.

The two beer products were subjected to a full taste panel assessment procedure. Product A was found to have an objectionable cidery, fruity, winey character. On the other hand, product B was judged to have a markedly better flavour being noticeably smoother and clean tasting. It is appreciated that such evaluation is to some extent inherently subjective in that acceptability or otherwise of such beer products depends on personal preference. However, the above comments are helpful in the present instance since they clearly demonstrate that the introduction of the highly fermentable sugar adjunct in the manner taught by the present invention has a significant effect on the organoleptic properties of the product. In fact, the beer product is clearly a different product to that product under similar conditions but using the prior art method of introducing the adjunct at the start of the fermentation.

EXAMPLE 1(ii)

Above example 1(i) compares the process of the present invention with that of a "one-shot" or "direct addition" process wherein all the sugar adjunct is added at the commencement of the fermentation. In the following experiment, the process of the invention is compared with a direct addition process wherein the whole of the sugar adjunct was added to the fermenting wort at the point in time when, in the process of the present invention, infusion of the sugar adjunct would commence.

PROCEDURE

An all-malt wort (9.43° P.), was prepared using standard procedures and divided into two 35 liter portions, A and B. Following pitching at a rate of 0.3 g %, fermentation was allowed to proceed for 25.5 hours. At that time 1.5 kg of sucrose was added to partially fermented wort A in via a "one-shot". At the same point in time, infusion of an aqueous solution containing 37% sucrose into partially fermented wort B began, infusion lasting about 26 hours during which 1.5 kg of sucrose were introduced into the wort. The course of the fermentation was followed by periodic evaluations of Plato value of the wort and also its alcohol content. The results being shown in FIG. 2 and FIG. 3, respectively. Following completion of the fermentation, the green beer was processed to finished beer under routine brewery cellar conditions. The products were subjected to routine analysis with the following results:

|  | Wort A Product | Wort B Product |
|---|---|---|
| Colour | 2.5 | 2.5 |
| Foam, sec. | 98 | 123 |
| Calculated Original Extract, % | 12.1 | 12.3 |
| Apparent Extract, % | 1.15 | 0.94 |
| Real Extract, % | 3.26 | 3.14 |
| Alcohol, vol., % | 5.84 | 6.02 |
| Alcohol, wt., % | 4.59 | 4.74 |
| pH | 4.15 | 4.15 |
| Diacetyl, ppm | .04 | .05 |
| Bitterness Units | 15.0 | 16.0 |
| Initial Haze, FTU | 70.70 | 70.60 |
| Attenuation % | 73 | 74 |

As the above results clearly show, the two fermentations progressed quite differently, the addition of the sucrose via the "one-shot" route resulting in a large increase in wort Plato value which disrupted the yeast enzyme systems from which the yeast did not, in fact, fully recover as indicated by its changed ability to produce alcohol—refer FIG. 3. An obvious difference between the two processes is the lower Plato value achieved by the infusion process, the Plato value of the final wort being 1.00° P. versus 1.54° P. for the one-shot procedures.

Consequently, as would be expected, the two products are different as the analysis results show.

EXAMPLE 1(iii)

Above example 1(ii) was repeated but glucose was used instead of sucrose as the highly fermentable sugar. Infusion commenced at the 26 hour mark in the fermentation and continued for 24 hours. The progress of the fermentation is shown in FIG. 4. Product analysis gave the following results:

|  | Wort A Product | Wort B Product |
|---|---|---|
| Colour | 2.7 | 2.9 |
| Foam, sec. | 123 | 123 |
| Calculated Original Extract, % | 11.8 | 12 |
| Apparent Extract, % | 1.24 | 1.11 |
| Real Extract, % | 3.28 | 3.20 |
| Alcohol, vol., % | 5.60 | 5.75 |
| Alcohol, wt., % | 4.40 | 4.52 |
| pH | 4.10 | 4.15 |
| Diacetyl, ppm | 0.04 | 0.04 |
| Bitterness Units | 15.5 | 18.5 |
| Initial Haze, FTU | 58 | 58 |
| Attenuation % | 72 | 73 |

The results are similar to those obtained when sucrose was used (cf Example 1(ii) above).

In summary, the sudden introduction into the fermenting wort of a large amount of a highly fermentable sugar upsets the normal action of the yeast-making process and the indications are that the yeast does not appear to be able to fully recover. Consequently, control of the process suffers and desirable high attenuation rates may not be achieved.

EXAMPLE 2

This example again illustrates the production of a beer having a reduced caloric value (according to the definition referred to above), the malt substrate used comprising brewers' malt, distillers' malt and caramel malt.

PROCEDURE

An all-malt hopped wort was prepared using conventional brewing techniques, the malt system used comprising a mixture of brewers' malt, distillers' malt and caramel malt such that the kettle extract or wort was derived, 60% from brewer's malt, 35% from distiller's malt and 5% from caramel malt. Twenty (20) liters of the wort containing 2,275 g. of extract (at about 11° P.) was pitched with 100 g. of pressed lager yeast and delivered to a fermenter which was operated at a controlled temperature of 15°.

Twenty (20) liters of a hopped sugar solution containing 975 g. sucrose (equivalent to about 4.7° P.) was infused into the fermenting wort during the 48 hour to 72 hour period of the fermentation cycle. The sucrose solution represented 30% of the total extract associated with the resultant beer.

The total fermentation period lasted nine days following which the green beer was transferred to storage and processed under routine brewery cellar conditions to finished beer. The bottled pasteurized beer upon analysis gave the following results.

| Colour, °srm | 3.2 |
|---|---|
| Foam, Sec. | 117 |
| Calculated Original Extract, % | 8.3 |
| Apparent Extract, % | 0.0 |
| Real Extract, % | 1.62 |
| Alcohol, vol. % | 4.30 |
| Alcohol, wt. % | 3.39 |
| pH | 4.0 |
| Diacetyl, ppm | 0.04 |
| Bitterness Units | 16.5 |
| Initial Haze, FTU | 65 |
| Calories/12 oz. bottle | 102 |
| Attenuation % | 80 |

EXAMPLE 3

This example details the production of a higher alcohol beer known as "malt liquors" with outstanding flavour attributes.

PROCEDURE

Sixty (60) liters of a brewers' wort was prepared using concentional brewing techniques such that 70% of the "malt" extract or wort was derived from brewers' malt and 30% derived from corn grits. This wort had an original gravity of 14.4° Plato with a relatively high non-fermentable extract content but with sufficient fermentable extract to produce a beer containing 5% alcohol by volume.

The wort was pitched with 200 g. of pressed lager yeast and delivered to a fermenter operating at a controlled temperature of 15° C. Twenty (2) liters of sugar solution containing 6,000 G of sucrose (equivalent to about 27° P.) was infused into the fermenting wort during the 48 hour to 72 hour period of the fermentation cycle and following a total fermentation period of seven days, the green beer was transferred to storage and processed to finished beer under routine cellar conditions. The bottled pasteurized product subjected to routine analysis and gave the following results:

| Colour | 3.7 |
|---|---|
| Foam, Sec. | 136 |
| Calculated Original Extract, % | 17.6 |
| Apparent Extract, % | 3.05 |
| Real Extract, % | 5.89 |
| Alcohol, vol. % | 8.02 |
| Alcohol, wt. % | 6.25 |
| pH | 3.95 |
| Diacetyl, ppm | 0.02 |
| Bitterness Units | 18.5 |
| Initial Haze, FTU | 57 |
| Attenuation % | 67 |

The product is a full bodied malt liquor having a high alcohol content and excellent flavour characteristics. It may be noted that the degree of attentuation at 67%, is appreciably lower than that achieved during the production of "light" beers.

It is worth noting that, from the specific examples, sucrose is obviously at present, the most preferred highly fermentable sugar. However, it will be appreciated that, practically, any sugars which are readily fermentable by brewers' yeast could be used but from a practical consideration, only sucrose, fructose and glucose are commercially available.

EXAMPLE 4

A mixture of malt (regular brewing malt, distillers' malt and carastan malt) and water is subjected to a mash cycle involving a twenty minute rest at 118° F. and subsequently, a two hour rest at 146° F., following which heating at 170° F. was effected for a short period. Using standard lautering procedures 360 bbls of wort at approximately 10.7° P. was obtained and introduced into the kettle. About 180 lb of hops were added and the kettle contents boiled for one hour during which the wort reduced 5% by volume. The hops were separated from the wort which was then cooled, oxygenated and pumped to a fermenter along with a further 230 bbls of water resulting in the fermenter containing 500 bbls of wort of approximately 6.7° P. at 66° F. Yeast, in an amount of ¼ lb pressed yeast/bbl wort, was added and during the next 8–12 hours the temperature rose to 58° F., which temperature was maintained until the free temperature rise later in the fermentation cycle. Fermentation of the all-malt wort continued for 48 hours. Commencing at the 48 hour mark, a concentrated sugar solution (42% solids on a weight basis; about 42° P.) was continuously infused via a proportioning pump over the next 24 hours. The amount of sugar added (about 4,305 lbs) was predicated on a malt extract:sucrose ratio of 70:30. The 24 hour infusion period permits the yeast to ferment the sucrose at substantially the same rate as it is added, i.e. there is no rise in Plato value of the wort. Following completion of the sucrose addition, the fermentation temperature is permitted to rise to 60°–62° F. for flavour and maturation development. Fermentation was completed at five (5) days when the fermenter contents were cooled and moved to storage at seven (7) days.

The subsequent cellar treatment utilized standard brewery procedures and techniques. Oxygen-free water was added to the beer after the final filtration to reduce the calculated original gravity to about 7.7° P.

The properties of the resulting beer product along with process parameters are contained in the following table:

| Colour | 3.1 |
|---|---|
| Foam, sec. | 130 |
| Calculated Original Extract, % | 7.7 |
| Apparent Extract, % | 0.01 |
| Real Extract, % | 1.49 |
| Alcohol, vol., % | 3.93 |
| Alcohol, wt., % | 3.11 |
| pH | 4.00 |
| Diacetyl, ppm | 0.04 |
| Bitterness Units | 19.0 |
| Initial Haze, FTU | 90 |
| Attenuation, % | 81 |

As will be obvious, the water used in the Plato adjustment procedure used in the above embodiment does not take up plant capacity prior to the fermenter and, in effect, that procedure allows increases in the plant capacity without capital cost.

In another embodiment of the process, the same amount of water was used to dilute the sucrose syrup to 12% solids by weight; about 12° P., prior to its addition to the fermenter, the other process conditions remaining essentially the same.

The beer produced and corresponding process parameters are contained in the following table:

| Colour | 3.1 |
|---|---|
| Foam, sec. | 133 |
| Calculated Original Extract, % | 7.7 |
| Apparent Extract, % | 0.00 |
| Real Extract, % | 1.49 |
| Alcohol, vol., % | 3.97 |
| Alcohol, wt., % | 3.13 |
| pH | 4.05 |
| Diacetyl, ppm | 0.03 |
| Bitterness Units | 20.5 |
| Initial Haze, FTU | 85 |
| Attenuation, % | 81 |

It should be noted that the same amount of sucrose had been added to the wort over the same time period. As can be seen, the beers produced are not significantly different, thus which illustrates the flexibility of the process in producing consistent products.

What I claim is:

1. In a brewing process wherein a malt wort is prepared; supplemented with a sugar adjunct, fermented with brewers' yeast; and, following completion of the fermentation, finished to the desired alcoholic brewery beverage; the improvement comprising initially fermenting a malt wort with brewers' yeast to produce a yeast population at least about one-half of the maximum amount of population development obtainable during the fermentation, thereby providing a partially fermented wort, thereafter introducing an adjunct comprising a highly fermentable sugar into the partially fermented wort over a period of time such that the Plato value of the fermenting wort substantially does not increase and osmotic shock is avoided, and then continuing the fermentation.

2. A process as claimed in claim 1 wherein said yeast population is initially partially developed to at least about two-thirds of the maximum amount of population development obtainable during the fermentation.

3. A process as claimed in claim 1 wherein the said adjunct is introduced into the wort at a rate such that the Plato value of the fermenting wort continues to decline.

4. A process as claimed in claim 1 wherein fermentation is continued until the degree of attenuation is 80% or more.

5. A process as claimed in claim 1 wherein the fermentation is continued until the real extract is less than 2%.

6. A process as claimed in claim 1 wherein the ratio of malt extract: highly fermentable sugar is at least 65:35.

7. A process as claimed in claim 1 wherein the ratio of malt extract: highly fermentable sugar is from 65:25 to 75:25.

8. A process as claimed in claim 1 wherein the introduction of the adjunct into the wort commences after the wort has been fermenting for from 18 to 36 hours.

9. A process as claimed in claim 1 wherein the introduction of the adjunct into the wort commences after the wort has been fermenting for from 44 to 54 hours.

10. A process as claimed in claim 1 wherein the adjunct is introduced into the wort over a period of from 12 to 48 hours and introduction commences 18 to 54 hours after the wort has commenced to ferment.

11. A brewing process as claimed in any of claims 1 to 9 wherein the adjunct is introduced into the wort over a period of from about 12 to 48 hours.

12. A process as claimed in any of claims 1 to 10 wherein the adjunct is introduced into the wort in the form of an aqueous solution comprising from 10% to 65% by weight of adjunct.

13. A process as claimed in any of claims 1 to 10 wherein the adjunct is introduced into the wort in the form of an aqueous solution comprising from 20 to 65% by weight of adjunct.

14. A process as claimed in any of claims 1 to 10 wherein the wort is an all malt wort.

15. A process as claimed in any of claims 1 to 10 wherein the wort is an all malt wort comprising brewers' malt and one, or both, of distillers' malt and caramel malt.

16. A process according to any of claims 1 to 10 wherein the adjunct is solely one or more highly fermentable sugars.

17. A process as claimed in any of claims 1 to 10 wherein the highly fermentable sugar is sucrose.

18. In a process wherein a malt wort is prepared; supplemented with a sugar adjunct, fermented with brewers' yeast; and, following completion of the fermentation, finished to the desired alcoholic brewery beverage; the improvement comprising initially fermenting a malt wort with brewers' yeast to produce a yeast population at least about one-half of the maximum amount of population development obtainable during the fermentation, thereby providing a partially fermented wort, thereafter introducing an adjunct comprising a highly fermentable sugar into the partially fermented wort over a period of time such that the Plato value of the fermenting wort substantially does not increase and osmotic shock is avoided, the ratio malt extract: highly fermentable sugar being from about 65:35 to 80:20, and then continuing the fermentation until the degree of attenuation is 80% or more.

19. A process as claimed in claim 18 wherein the fermentation is continued until the real extract is less than 2%.

20. A process as claimed in claim 18 wherein the ratio malt extract: highly fermentable sugar is from about 70:30 to 80:20.

21. A process as claimed in claim 18 wherein the said adjunct consists essentially of one or more highly fermentable sugars.

22. A process as claimed in claim 18 wherein the highly fermentable sugar is sucrose.

23. A process as claimed in claim 18 wherein the wort is an all malt wort.

24. A process as claimed in claim 18 wherein the adjunct is introduced into the partially fermented wort over a period of time of from 12 to 48 hours.

25. A process as claimed in claim 1 wherein the said adjunct is introduced into the wort at a rate such that the Plato value of the fermenting wort continues to decline.

26. A process as claimed in any of claims 18–25 wherein the highly fermentable sugar is introduced into the wort in the form of an aqueous solution comprising at least 15% by weight of sugar.

27. A process as claimed in any of claims 18 to 25 wherein the highly fermentable sugar is introduced in the form of an aqueous solution comprising about 20%–65% by weight of said sugar.

28. A process as claimed in any of claims 18 to 25 wherein the highly fermentable sugar is introduced in the form of an aqueous solution comprising about 40%–65% by weight of sugar.

29. A process as claimed in any of claims 18 to 25 wherein the introduction of the adjunct into the wort commences after the wort has been fermenting for from 18 to 54 hours.

30. A process as claimed in any of claims 18 to 25 wherein the introduction of the adjunct into the wort commences after the wort has been fermenting for from 18 to 36 hours.

31. A process as claimed in any of claims 18 to 25 wherein the introduction of the adjunct into the wort commences after the wort has been fermenting for from 44 to 54 hours.

32. In a brewing process wherein a malt wort is prepared; supplemented with a sugar adjunct, fermented with brewers' yeast; and, following completion of the fermentation, finished to the desired alcoholic brewery beverage; the improvement comprising initially fermenting a malt wort with brewers' yeast to produce a yeast population at least about two thirds of the maximum amount of population development obtainable during the fermentation, thereby providing a partially fermented all malt wort, thereafter introducing an adjunct comprising a highly fermentable sugar into the partially fermented wort over a period of time such that the Plato value of the fermenting wort substantially does not increase and osmotic shock is avoided, the ratio of malt extract: fermentable sugar being from 65:35 to 80:20, and then continuing the fermentation until the degree of attenuation is 80% or more.

33. A process as claimed in claim 30 wherein the malt comprises brewers' malt and one or both of distillers' malt and caramel malt.

34. A process as claimed in claim 32 wherein the said adjunct is introduced into the wort at a rate such that the Plato value of the fermenting wort continues to decline.

35. A process as claimed in claim 30 or 31 wherein the adjunct is introduced into the wort over a period of from 12 to 24 hours, and such introduction commences from 44 to 54 hours after the wort has commenced to ferment.

* * * * *